June 21, 1966     D. PETERSON     3,256,548
CULINARY ARTICLE
Filed May 25, 1964
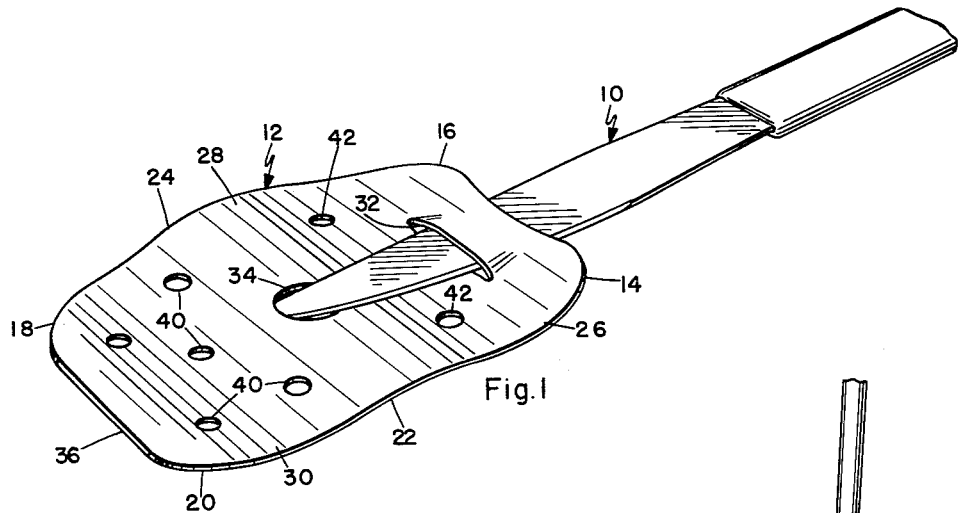
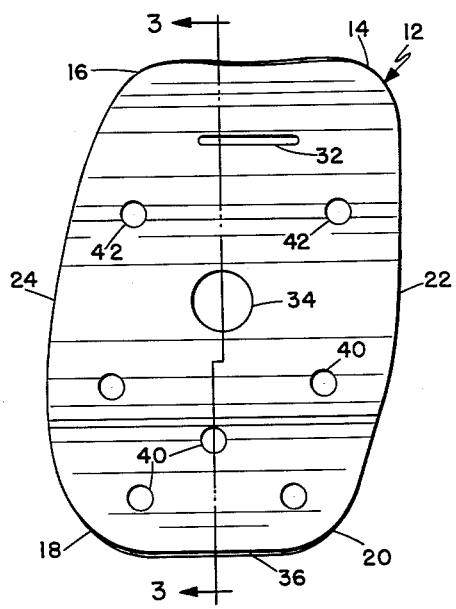
Fig. 2
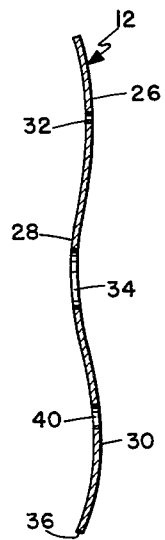
Fig. 3
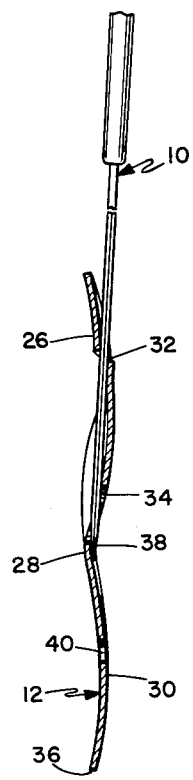
Fig. 4
*INVENTOR.*
DANA PETERSON
BY    *Knox & Knox*

United States Patent Office 3,256,548
Patented June 21, 1966

3,256,548
CULINARY ARTICLE
Dana Peterson, San Diego, Calif.
(Box 412, Coronado, Calif. 92118)
Filed May 25, 1964, Ser. No. 369,896
1 Claim. (Cl. 15—236)

The present invention relates generally to culinary articles and more particularly to such an article which can be readily adapted to a variety of uses.

It is the primary object of this invention to provide an improved culinary article in the form of a corrugated sheet metal member which can be used as a hand held scraper or, alternatively, provided with a handle and used as a stirrer, pancake turner and the like.

It is a further object of this invention to provide an improved culinary article having a handle frictionally secured thereto.

It is a still further object of this invention to provide an improved culinary article having means incorporated therein to facilitate gripping thereof by the hand of the user when used without the handle.

A still further and important object of this invention is to provide a culinary article having improved finger gripping means enabling the user to pick up the article from working surfaces.

Finally, it is an object to provide a culinary article of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

FIGURE 1 is a perspective view of the complete culinary article with the handle secured thereto;

FIGURE 2 is a plan view of the article with the handle removed;

FIGURE 3 is a cross section on the line 3—3 of FIGURE 2; and

FIGURE 4 is a cross section on a line similar to FIGURE 3 showing the handle in position.

This application is a continuation-in-part of my copending application Serial Number 150,072 filed November 3, 1961, now Patent No. 3,178,747, issued Apr. 20, 1965.

With particular reference to FIGURE 1 of the drawing, I have shown my improved culinary article in the form in which a handle 10 is secured in operative relationship to a generally rectangular working member indicated generally by the reference numeral 12. For purposes of illustration the handle 10 is shown as a conventional table knife but it is to be understood that it could be formed of any thin flat member of a width to fit the apertures in the member 12 as shown.

The member 12 shown detached from the handle in FIGURES 2 and 3, consists essentially of a flat piece of sheet material which may be either sheet metal or a high impact resistance plastic. It is generally rectangular in shape and has inherent resiliency. The four corners 14, 16, 18 and 20 are each formed on a different curvature for a purpose that will be hereinafter set forth. Extending transversely across the member 12 from one lateral edge 22 to the other lateral edge 24 are a series of corrugations 26, 28 and 30 so that the member 12 appears in cross section to have a wavy form as clearly shown in FIGURE 3 with the central corrugation 28 bowed in the direction opposite to that of two lateral corrugations 26 and 30 disposed on each side of the central corrugations 28. These corrugations give the member 12 lateral stiffness but permit flexing in a longitudinal direction.

Adjacent one end of said member 12 and at the center of corrugation 26 is a laterally extending slot 32 and, spaced from this slot, at approximately the center of the member 12 and at the center of central corrugation 28 is an aperture 34 here shown as being generally circular in shape.

My improved culinary article is adaptable to a variety of uses. When separated from the handle 10, it provides a convenient pot and pan scraper. The corrugations facilitate gripping of the member 12 in the hand of the user and the aperture 34 functions as a suitable finger hold. The straight end 36 is used as a scraping edge to remove grease, grit or other foreign matter from flat surfaces of cooking utensils while the curved corners 14, 16, 18 and 20 are used on the rounded or restricted portions as required. The corrugations 26, 28 and 30 facilitate in lifting the scraper from a flat surface, for it is apparent that regardless of how the member 12 is positioned, portions of it will be raised from the supporting surface for easy gripping by the hand of the user.

To convert the member 12 for use as a stirrer or egg and pancake turner or the like, the handle member 10 is used. This handle is inserted through the slot 32 so that it overlies the concave portion of corrugation 26 and the point 38 is then inserted through the aperture 34 where it frictionally engages the curved surface on the rear side of the corrugation 28. The curvature of the corrugations 26, 28 and 30 is such that there will be sufficient distortion of the member 12 as the handle is inserted through the slot 32 and aperture 34 to frictionally hold the handle in position and prevent accidental dislodgement during use. This arrangement of said slot, aperture and corrugations 28 and 30 insures that the point 38 of the handle is fully protected by the corrugation 30 so that, even if the point 36 is sharp, there is no danger of this point cutting, piercing or scraping any surface during use of the article.

To facilitate drainage of grease or other liquids from the member 12, it may, if desired, be provided with a plurality of drainage holes 40 spaced throughout at least that portion of the member adjacent to the end 36 thereof. As illustrated, further holes 42 are provided laterally of the slots 32 and aperture 34.

It is understood that minor variation from the form of the invention disclosed herein may be made without departure from the spirit and scope of the invention as claimed, and that the specification and drawing are to be considered as merely illustrative rather than limiting.

I claim:

A culinary article adapted for use with an elongate removable handle having an intermediate portion and an end portion terminating in a point, comprising:

a generally rectangular member of relatively thin resilient sheet material having hard scraper edges;

three formed corrugations extending completely across said member from one lateral edge to the other lateral edge thereof and including a central corrugation bowed in the direction opposite to that of two lateral corrugations disposed one on each side of the central corrugation; and said member having a slot disposed at the center of one of said lateral corrugations adapted to frictionally receive an intermediate portion of a flat bladed handle and an aperture at the center of the central corrugation for frictionally receiving an end portion of the handle with the point of the handle protected by a portion of said central corrugation and whereby said aperture is ideally situated to function as a finger hold.

References Cited by the Examiner

UNITED STATES PATENTS

| | | | |
|---|---|---|---|
| D. 120,610 | 5/1940 | Berge | 15—236 X |
| 323,502 | 8/1885 | Edwards | 30—169 |
| 1,211,098 | 1/1917 | Darrin | 15—236 |
| 2,380,855 | 7/1945 | Lower | 15—236 |
| 2,417,585 | 11/1945 | Cahill | 15—236 |
| 2,888,699 | 6/1959 | Bubar | 15—145 X |
| 3,178,747 | 4/1965 | Peterson | 15—236 |

CHARLES A. WILLMUTH, *Primary Examiner.*

WALTER SCHEEL, *Examiner.*

LEON G. MACHLIN, *Assistant Examiner.*